(12) United States Patent
Comanzo et al.

(10) Patent No.: US 8,404,153 B2
(45) Date of Patent: Mar. 26, 2013

(54) WHITE PERSISTENT PHOSPHOR BLEND OR LAYERED STRUCTURE

(75) Inventors: Holly Ann Comanzo, Niskayuna, NY (US); Alok Srivastava, Niskayuna, NY (US); William W. Beers, Chesterland, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 12/971,504

(22) Filed: Dec. 17, 2010

(65) Prior Publication Data

US 2012/0153226 A1 Jun. 21, 2012

(51) Int. Cl.
*C09K 11/08* (2006.01)

(52) U.S. Cl. .......... 252/301.4 R; 428/690; 252/301.4 H; 252/301.4 F; 252/301.6 F

(58) Field of Classification Search ........... 252/301.4 R, 252/301.6 F, 301.4 H, 301.4 F; 428/690
See application file for complete search history.

(56) References Cited

U.S. PATENT DOCUMENTS

| | | | |
|---|---|---|---|
| 5,376,303 A | 12/1994 | Royce et al. | |
| 6,267,911 B1 | 7/2001 | Yen et al. | |
| 2003/0227002 A1 | 12/2003 | Brown et al. | |
| 2003/0227003 A1 | 12/2003 | Brown et al. | |
| 2004/0135122 A1 | 7/2004 | Hyland, Jr. et al. | |
| 2004/0164277 A1 | 8/2004 | Yen et al. | |
| 2005/0212397 A1 | 9/2005 | Murazaki et al. | |
| 2007/0096058 A1 | 5/2007 | Hirata et al. | |
| 2007/0131907 A1 | 6/2007 | Hirata et al. | |
| 2008/0171229 A1 | 7/2008 | Comanzo et al. | |
| 2008/0179567 A1 | 7/2008 | Comanzo et al. | |
| 2008/0185557 A1 | 8/2008 | Agrawal et al. | |
| 2009/0152497 A1 | 6/2009 | Comanzo et al. | |
| 2010/0038591 A1 | 2/2010 | Matsuhisa et al. | |
| 2010/0136302 A1 | 6/2010 | Comanzo et al. | |

FOREIGN PATENT DOCUMENTS

| | | |
|---|---|---|
| EP | 0148110 | 7/1985 |
| EP | 0765925 | 4/1997 |
| EP | 1681334 | 7/2006 |
| EP | 1900789 | 3/2008 |
| GB | 2443155 | 4/2008 |
| JP | 2000034480 | 2/2000 |
| JP | 2002020744 | 1/2002 |
| WO | 9632457 | 10/1996 |
| WO | 2005044944 | 5/2005 |
| WO | 2005044946 | 5/2005 |
| WO | 2007034609 | 3/2007 |
| WO | 2007143379 | 12/2007 |
| WO | 2008041760 | 4/2008 |

*Primary Examiner* — Carol M Koslow
(74) *Attorney, Agent, or Firm* — Pearne & Gordon LLP

(57) ABSTRACT

This disclosure features a blend, or use together in at least two layers of an article of manufacture, of a first persistent phosphor, a second persistent phosphor and a third phosphor. The first persistent phosphor has a formula I:

$$Ca_{x-y-z-a}A_aAl_{2-m-n-o-p}O_d:Eu_y,RE_z,B_m,Zn_n,Co_o,Sc_p \qquad I$$

where the variables are defined in the disclosure. The second persistent phosphor has a formula II:

$$Sr_{x-y-z-a}A_aAl_{14-m-n-o-p}O_d:Eu_y,RE_z,B_m,Zn_n,Co_o,Sc_p \qquad II$$

where the variables are defined in the disclosure. The third phosphor is a non-persistent phosphor that is excited at a wavelength in a range of 300-500 nm. Also featured is an article of manufacture including the blend or the phosphors present in at least two layers. Once the blend or layered structure comprising the three phosphors has been excited it can appear white in an absence of ambient light.

23 Claims, 5 Drawing Sheets

WHITE PERSISTENT PHOSPHOR BLEND OR LAYERED STRUCTURE

This disclosure pertains to a phosphor blend or layered structure comprising two persistent phosphors and a third phosphor that is excited by emissions from the persistent phosphors. Once the phosphor blend or layered structure has been excited it appears white in an absence of ambient light.

BACKGROUND OF THE INVENTION

Researchers have tried to produce a white persistent phosphor by blending a blue persistent phosphor, a green persistent phosphor and a red persistent phosphor. However, this approach is problematic because each of the persistent phosphors decays at a different rate, causing a color change with time, the blend is of low intensity and is not long persisting within the white color regime. However, producing a high efficiency, long persistent white phosphor remains elusive.

BRIEF DESCRIPTION OF THE INVENTION

This disclosure features a blend of a first persistent phosphor, a second persistent phosphor and a third non-persistent phosphor, wherein the first persistent phosphor has a formula I:

$$Ca_{x-y-z-a}A_aAl_{2-m-n-o-p}O_d:Eu_y,RE_z,B_m,Zn_n,Co_o,Sc_p \qquad I$$

where x is between 0.75 and 1.3; y is between about 0.0005 and about 0.1; z is between about 0.0005 and about 0.1; a is between about 0 and about 0.2; A is one or both of Sr and Ba; m is between about 0 and about 0.3; n is between about 0 and about 0.1; o is between about 0 and about 0.01; p is between about 0 and about 0.10; and RE is any rare earth ion, in particular, one or both of $Nd^{3+}$ and $Dy^{3+}$ and d ranges from about 3.945 to about 4.075 and is, in particular 4.

The second persistent phosphor has a formula II:

$$Sr_{x-y-z-a}A_aAl_{14-m-n-o-p}O_d:Eu_y,RE_z,B_m,Zn_n,Co_o,Sc_p \qquad II$$

where x is between 3.0 and 5.2; y is between about 0.0005 and about 0.1; z is between about 0.0005 and about 0.1; a is between about 0 and about 0.2; A is one or both of Ca and Ba; m is between about 0 and about 0.3; n is between about 0 and about 0.1; o is between about 0 and about 0.01; p is between about 0 and about 0.10; RE is any rare earth ion, in particular, one or both of $Nd^{3+}$ and $Dy^{3+}$ and d ranges from about 23.945 to about 26.425 and is, in particular 25. Cobalt's and europium's oxidation states can be 2+; all other oxidation states of the elements of formulas I and II should be apparent to one of ordinary skill in the art in view of this disclosure.

Charge compensation may take place by excess oxygen ions in the structure or by inducing cation vacancies. For example, when $Dy^{3+}$ substitutes for $Sr^{2+}$, the charge compensation may take place by introducing a $Sr^{2+}$ ion vacancy by the process $2Dy^{3+} \rightarrow 3Sr^{2+}[\ ]_z$. Or the charge compensation may occur via the process $Sr_{1-z}Dy_zAl_2O_{4+z/2}$. Similarly, when $Co^{2+}$ substitutes for $Al^{3+}$ the charge compensation may occur via $SrAl_{2-o}Co_oO_{4-o/2}$ (where the subscript is the letter o, not the number 0). But, this disclosure is not limited to these charge compensation modes.

The third phosphor is a non-persistent phosphor that is excited at a wavelength in a range of 300-500 nm and, in particular, at about 460 nm.

Referring to more specific features, a specific formula II of the second persistent phosphor can be $Sr_{4-y-z}Al_{14}O_{25}:Eu^{2+}{}_y, Dy^{3+}{}_z$. A specific formula I of the first persistent phosphor can be $Ca_{1-y-z}Al_2O_4:Eu^{2+}{}_y, Nd^{3+}{}_z$. The third phosphor can be selected from the group consisting of $3.5MgO\cdot0.5MgF_2\cdot GeO_2$: $Mn^{4+}$ (MFG); $Y_3Al_5O_{12}:Ce^{3+}$ (YAG:Ce); (Tb, Y, Lu, La, Gd)$_3$(Al, Ga)$_5O_{12}:Ce^{3+}$ (TAG:Ce); (Ca, Sr)$_8$(Mg,Zn)(SiO$_4$)$_4$Cl$_2$:Eu$^{2+}$, $Mn^{2+}$ (CASI) and combinations thereof. The third phosphor can be selected from the group consisting of a yellow emitter, a yellow-orange emitter, an orange-red emitter, a red emitter and combinations thereof. There can be at least one additional phosphor in the blend. Once the phosphor blend has been excited it appears white in an absence of ambient light. Also featured is an article of manufacture that includes the phosphor blend disclosed herein.

Ratios of amounts (in % wt) of the third non-persistent phosphor, the second persistent phosphor and the first persistent phosphor in the blend can be approximately 2-3:2-4:3-5, respectively and, in particular, approximately 3:3:4.5, still more particularly approximately 2.5:3:4.5, respectively, with the amounts of the three phosphors totaling 100% of the blend by weight.

The first persistent phosphor emits blue light having a wavelength in a range of 420-470 nm. The second persistent phosphor emits blue green light having a wavelength in a range of 460-535 nm. The third, non-persistent phosphor emits, for example, yellow-red light having a wavelength in a range of 560-650 nm.

The phosphor blend has a relatively high initial intensity, long persistence and good color stability with time compared to known white emitting phosphors. The phosphor blend will allow for better performance in products which incorporate this material. This improvement will also allow novel applications which depend on the ability to produce stable white color, and high light output such as this composition provides. Also, an advantage of this phosphor blend is that the first and second persistent phosphors decay similarly, which avoids the problem of different rates of decay leading to color instability of the conventional red, green and blue persistent phosphor blend.

Also featured is an article of manufacture comprising at least two layers having one or more of the first persistent phosphor, the second persistent phosphor and the third phosphor in each of the layers. That is, each of the first, second and third phosphors is present in the article of manufacture. However, the first and second phosphors can be in one layer, the third phosphor can be in a layer with one of the first and second phosphors, or each of the first, second and third phosphors can be present in three layers in a separate layer from the others.

When numerical values are given as a range in this disclosure they include the endpoints of the range; for example, values ranging from about 5 to about 25 include 5 and 25.

Many additional features, advantages and a fuller understanding of the invention will be had from the accompanying drawings and the Detailed Description of the Invention that follows. It should be understood that the above Brief Description of the Invention describes embodiments of this disclosure in broad terms while the following Detailed Description of the Invention describes embodiments of this disclosure more narrowly and presents specific embodiments that should not be construed as necessary limitations of the broad invention as defined in the claims.

DETAILED DESCRIPTION OF THE INVENTION

Figure 1:
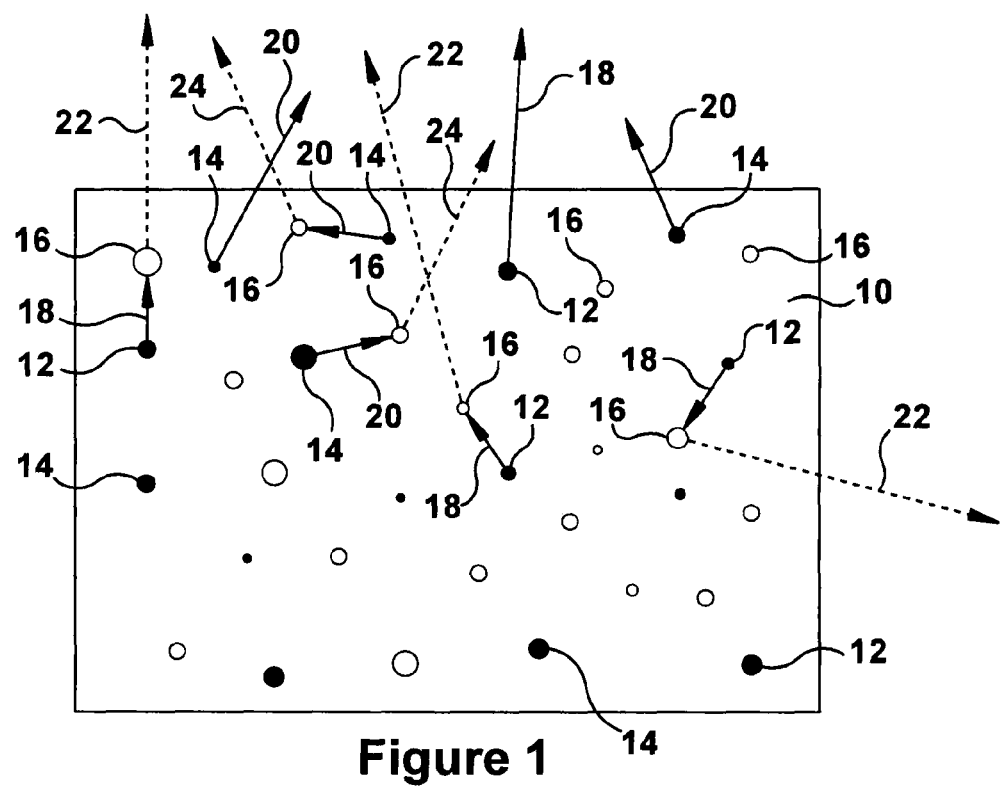
FIG. 1 is a diagrammatical representation of a structure impregnated with particles of first and second persistent phosphors and a third, non-persistent phosphor.

FIG. 1 shows a matrix 10 comprising a blend of particles 12 of the first persistent phosphor, particles 14 of the second persistent phosphor and particles 16 of the third non-persistent phosphor. In this illustration the excitation has ended and the first and second persistent phosphor particles are emitting stored energy as photons. These first and second photons 18, 20 emitted from the first and second persistent phosphors 12, 14, respectively, may escape the matrix as indicated by arrows in FIG. 1 that do not point to another particle. Alternatively, the emitted first and second photons 18, 20 may be absorbed by particles 16 of the third, non-persistent phosphor, as represented by arrows of FIG. 1 which point to another particle, which then releases the captured energy as longer wavelength photons 22, 24, respectively. The visible combination of the three types of photons emitted from the matrix results in a white color for the luminescence of the blend of phosphors as opposed to the color of the luminescence of the phosphors individually. In this embodiment the phosphors are blended before being incorporated into the polymer matrix. In other embodiments each phosphor may be separately incorporated into the matrix to form a final composition comprising a phosphor blend. Those skilled in the art will realize that the matrix is not limited to polymers but may also encompass other materials such as paint, glass, or other organic or inorganic matrices, including such materials as transparent ceramics.

Figure 2:
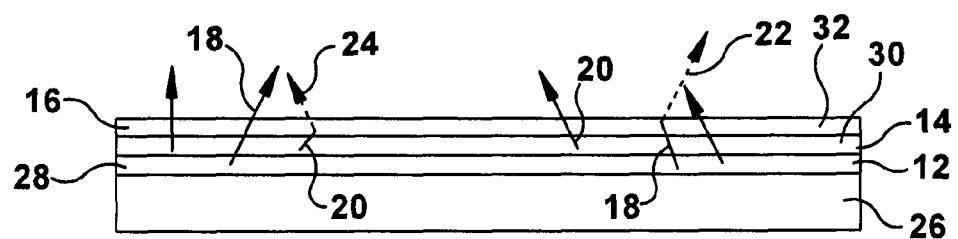
FIG. 2 is a diagrammatical representation of a layered structure comprising each of the first persistent phosphor, the second persistent phosphor and the third persistent phosphor in different layers.

FIG. 2 shows an alternate configuration for a multiple phosphor structure. In FIG. 2 a substrate 26 is coated with a layer 28 comprising particles 12 of the first persistent phosphor, a layer 30 containing particles 14 of the second persistent phosphor and a layer 32 comprising particles 16 of the third, non-persistent phosphor. After the excitation is removed, photons 18, 20 emitted from the first and second persistent phosphors, respectively may escape, as indicated in FIG. 2 by the arrows that do not deflect. Alternatively, the photons 18, 20 emitted from the first and second persistent phosphor particles 12, 14 may be absorbed by the third phosphor particles 16, which then emits the absorbed energy as longer wavelength photons 22, 24, respectively. This is shown by the arrows that originate from layers 28 or 30 and are deflected by particles of layer 32. The short wavelength photons of the first persistent phosphor are blue, the short wavelength photons of the second persistent phosphor are blue-green and the longer wavelength photons of the third, non-persistent phosphor are, for example, red or yellow, which results in the overall structure having a white luminescence. Further, it should be appreciated that the two persistent phosphors can be mixed together in one layer or the third phosphor could be present in a layer comprising one of the persistent phosphors. The ordering of the layers may be controlled to tune the appearance of the emission.

Each of the first persistent phosphor and the second persistent phosphor can be formed by the following process. The oxygen-containing starting material compounds of the first persistent phosphor and the second persistent phosphor may be in the form of oxides, carbonates, nitrates, sulfates, phosphates, citrates, carboxylates, and combinations of these compounds. In compositions comprising carboxylates, the carboxylates used may have from one to five carbon atoms, such as formates, ethanoates, proprionates, butyrates, and pentanoates. These starting compounds are present in amounts (% wt) that can produce the composition of formula I and the composition of formula II having the indicated molar amounts of atoms. For example, the first persistent phosphor, $Ca_{0.90}Eu_{0.005}Nd_{0.03}Al_2O_4$ may be produced by mixing powders of oxygen-containing compounds of europium, neodymium, an alkaline earth metal and a group 13 metal.

As to the details regarding the following process, refer to U.S. patent application Ser. No. 12/640,712 (corresponding to published U.S. application Pub. No. US 2010/0136302). The mixture of starting materials for producing the first and second persistent phosphors can also comprise a flux, such as boric acid, lithium tetraborate, lithium carbonate, hydrogen borate, an alkali hydroborate, or a mixture of these compounds. According to another embodiment of the present invention, the flux may be a halide compound, such as a fluoride, of europium, neodymium, the alkaline-earth metals, or the group 13 metals. The halide compound can comprise up to 10 percent, by weight, of the mixture. The flux may also be an alkali halide, such as lithium fluoride, sodium fluoride, or other alkali halides. When using a flux, it may be desirable to wash the product with hot water to remove residual soluble impurities originating from the flux.

The oxygen containing starting compounds for each of the first persistent phosphor and the second persistent phosphor may be mixed together by any mechanical method. Such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders for each of the first persistent phosphor and the second persistent phosphor is separately fired in a reducing atmosphere at a temperature in a range from about 900° C. to about 1,700° C. for a time sufficient to convert the mixture to a solid solution of the phosphor. For example, the temperature may be in the range from about 1,000° C. to about 1,400° C. and, in particular about 1200° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 3° C./minute to about 200° C./minute. In exemplary embodiments, the temperature is raised to the final temperature at rates of about 10° C./minute to about 100° C./minute. Those skilled in the art will recognize that the precise conditions needed for the synthesis of a particular phosphor composition will depend on the phosphor chosen and are within the ambit of the conditions above.

The firing is performed under a reducing atmosphere, which may include such compounds as hydrogen, carbon monoxide, ammonia, hydrazine, or a mixture of these compounds with an inert gas such as nitrogen, helium, argon, krypton, xenon.

In one aspect a mixture of hydrogen and nitrogen, comprising hydrogen in an amount from about 0.5 volume percent to about 10 volume percent may be used as a reducing gas A particular atmosphere that can be used is 1% $H_2$ and 99% $N_2$. In another aspect the reducing gas may be carbon monoxide, generated in situ in the firing chamber by the reaction between residual oxygen and carbon particles placed in the firing chamber. In yet another aspect, the reducing atmosphere is generated by the decomposition of ammonia or hydrazine. In exemplary aspects, after firing, the phosphor may be ball milled in a propanol slurry to break up aggregates that may have formed during firing.

The persistent phosphors may be made into particles of about 1 to 5 microns, or larger, using standard firing techniques. Alternatively, nano-scale particles may be made using emulsion techniques.

Many of the phosphor starting materials may be commercially available. The phosphor blend may consist of commercially available persistent phosphors $CaAl_2O_4:Eu^{2+}, Nd^{3+}$ and $Sr_4Al_{14}O_{25}:Eu^{2+}Dy^{3+}$ if they satisfy formulas I and II and commercially available conventional phosphors YAG; Ce and or TAG:Ce or any other conventional phosphor excited in the long UV wavelength region and emitting in the yellow to red wavelength region.

Once the first and second persistent phosphors and the third non-persistent phosphor have been made or obtained commercially they can be blended together at selected weight ratios (% wt) to produce the desired color. The phosphors are then mixed together by any mechanical method. Such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders. If the mixture is wet, it may be dried first before being fired. The drying may be carried out at ambient atmosphere or under a vacuum.

The particle size of the phosphors, including that of the entire blend, may range, for example, from 1 micron and less to 50 microns and will depend on the application of interest.

This disclosure features a blend, or use together in an article of manufacture, of a first persistent phosphor, a second persistent phosphor and a third phosphor. The first persistent phosphor has a formula I:

$$Ca_{x-y-z-a}A_aAl_{2-m-n-o-p}O_d:Eu_y,RE_z,B_m,Zn_n,Co_o,Sc_p \qquad \text{I}$$

where x is between 0.75 and 1.3; y is between about 0.0005 and about 0.1; z is between about 0.0005 and about 0.1; a is between about 0 and about 0.2; A is one or both of Sr and Ba; m is between about 0 and about 0.3; n is between about 0 and about 0.1; o is between about 0 and about 0.01; p is between about 0 and about 0.10; RE is one or both of $Nd^{3+}$ and $Dy^{3+}$ and d ranges from about 3.945 to about 4.075.

A specific formula I of the first persistent phosphor can be $Ca_{1-y-z}Al_2O_4:Eu^{2+}_y, Nd^{3+}_z$. One example of the first persistent phosphor is the blue first persistent phosphor, $Ca_{0.96}Eu_{0.01}Nd_{0.03}Al_2O_4$.

The second persistent phosphor has a formula II:

$$Sr_{x-y-z-a}A_aAl_{14-m-n-o-p}O_d:Eu_y,RE_z,B_m,Zn_n,Co_o,Sc_p \qquad \text{II}$$

where x is between 3.0 and 5.2; y is between about 0.0005 and about 0.1; z is between about 0.0005 and about 0.1; a is between about 0 and about 0.2; A is one or both of Ca and Ba; m is between about 0 and about 0.3; n is between about 0 and about 0.1; o is between about 0 and about 0.01; p is between about 0 and about 0.10; RE is one or both of $Nd^{3+}$ and $Dy^{3+}$ and d ranges from about 23.945 to about 26.425.

A specific formula II of the second persistent phosphor is $Sr_{4-y-z}Al_{14}O_{25}:Eu^{2+}_y, Dy^{3+}_z$. One example of the second persistent phosphor is the blue-green persistent phosphor, $Sr_{3.92}Eu_{0.05}Dy_{0.03}Al_{14}O_{25}$.

The third phosphor is a non-persistent phosphor that is excited at a wavelength in a range of 350-500 nm and, in particular, about 460 nm. The third phosphor can be selected from the group consisting of $3.5MgO-0.5MgF_2-GeO_2:Mn^{+4}$ (MFG); $Y_3Al_5O_{12}$; Ce(YAG:$Ce^{3+}$); (Tb, Y, Lu, La, Gd)$_3$(Al, Ga)$_5O_{12}$:$Ce^{3+}$ (TAG:Ce); (Ca, Sr)$_8$(Mg,Zn)(SiO$_4$)$_4$Cl$_2$:$Eu^{2+}$, $Mn^{2+}$ (CASI) and combinations thereof. The third phosphor can be selected from the group consisting of a yellow emitter, a yellow-orange emitter, an orange-red emitter, a red emitter and combinations thereof.

There can be at least one additional phosphor in the blend. Once the phosphor blend has been excited it appears white in an absence of ambient light. Also featured is an article of manufacture that includes the phosphor blend or includes at least two layers, at least one of the first persistent phosphor, second persistent phosphor and third non-persistent phosphor being disposed in each layer.

Incorporation of the phosphor blend, or the individual first, second and third phosphors, into a matrix or layers on a substrate as shown in FIGS. 1 and 2, may be implemented using standard processing techniques for the matrix material chosen. For example, in embodiments of the current invention, the phosphors could be incorporated into a paint composition by mixing a powder blend into the base paint mixture, as if the phosphors were a dry pigment. In other embodiments, the phosphors could be stirred into a solvent to form a slurry prior to incorporation in the base paint mixture. The paint is an article of manufacture.

The phosphor blend or individual first, second and third phosphors may be used in any number of applications requiring long term light in locations that have no energy source for powered lighting. A plastic matrix may comprise embedded particles of a persistent phosphor. On the other hand, the phosphor particles may be incorporated into the plastic matrix of a film or surface layer attached to the body of a structure. Refer to U.S. patent application Ser. No. 12/640, 712, for a description of a plastic matrix with embedded phosphor or a film or surface layer attached to the body of a structure. Incorporation of the phosphor particles into the matrix or surface layer may be implemented using normal plastics processing techniques. Such techniques could include compression molding, injection molding, sheet forming, film blowing, or any other plastics processing technique that can incorporate a dry powder into a plastic matrix. One skilled in the art will recognize that the plastic matrix material used in these techniques may be any thermoplastic material with sufficient translucency to allow light transfer through thin layers, including, but not limited to, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Furthermore, thermoset materials may also be used for the plastic matrix, including such compounds as silicon room temperature vulcanized (RTV) compounds and epoxies, among others. The phosphors can be incorporated into the thermoset resins by mixing the phosphor with one of the two reactant portions. Further, the matrix does not need to be plastic. One of ordinary skill in the art will recognize that the phosphors of the present disclosure may be incorporated into glass or ceramic matrices as well. The phosphor may be incorporated into a liquid such as a paint or resin which can form the matrix or the film on a substrate.

Particles of the phosphor may lack compatibility with the matrix leading to agglomeration during processing. This effect may be especially severe for smaller particles, such as nano-scale particles, discussed below. For both types of phosphor particles, the effect may be lessened by coating the particles prior to incorporation in the matrix. The coating may include either small molecule ligands or polymeric ligands. Exemplary small molecule ligands may include octyl amine, oleic acid, trioctylphosphine oxide, or trialkoxysilane. Those skilled in the art will realize that other small molecule ligands may be used in addition to, or in place of, those listed here. The particles may also be coated with polymeric ligands, which may be either synthesized from the surface of the particles or added to the surface of the nano-scale particles. A discussion of growing polymer chains from the surface of the phosphor particles and coating the phosphor particles with a polymer coating is provided in the Ser. No. 12/640,712 application.

The individual first, second and third phosphors or the phosphor blend may be milled to form smaller particles and break up aggregates. The final phosphor may then be incorporated into the matrix to form the final product. If still smaller particles are needed, micro-emulsions may be used to generate nano-scale particles of the first and second persistent phosphors. Such nano-scale phosphor particles may be from about 900 nm to 100 nm in size, or even smaller. A discussion of a sol-gel based micro-emulsion process for the formation of nano-scale particles of a metal oxide phosphor is provided in the Ser. No. 12/640,712 application. Another microemulsion-based process for forming nano-scale particles of the metal oxide phosphor is also discussed in the Ser. No. 12/640,712 application.

Figure 3:
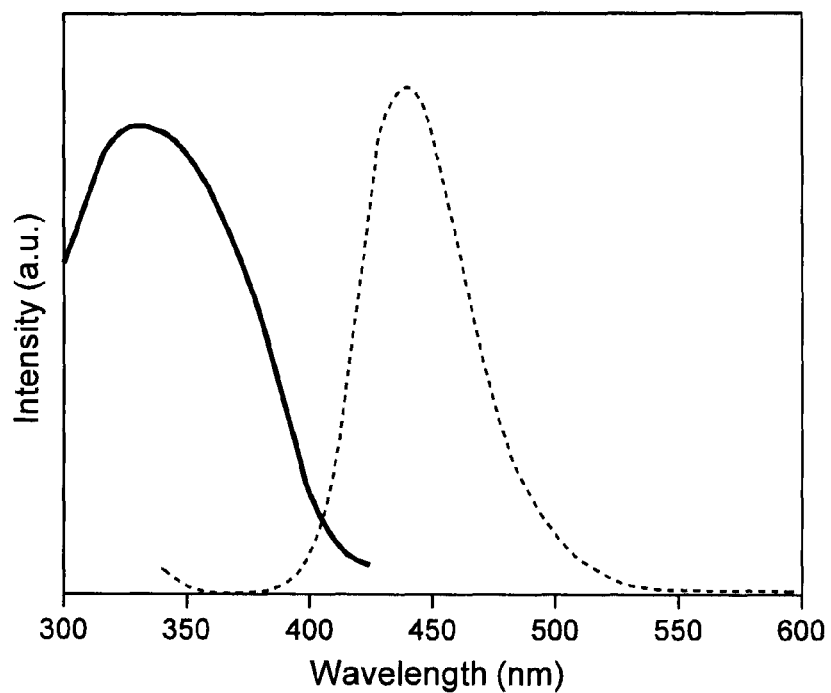
FIG. 3 is a graphical representation of exemplary excitation and emission spectra for first persistent phosphor, $Ca_{0.90}Eu_{0.005}Nd_{0.03}Al_2O_4$; in all of the figures the excitation spectra is shown in solid lines while the emission spectra is shown in dotted lines.
Figure 4:
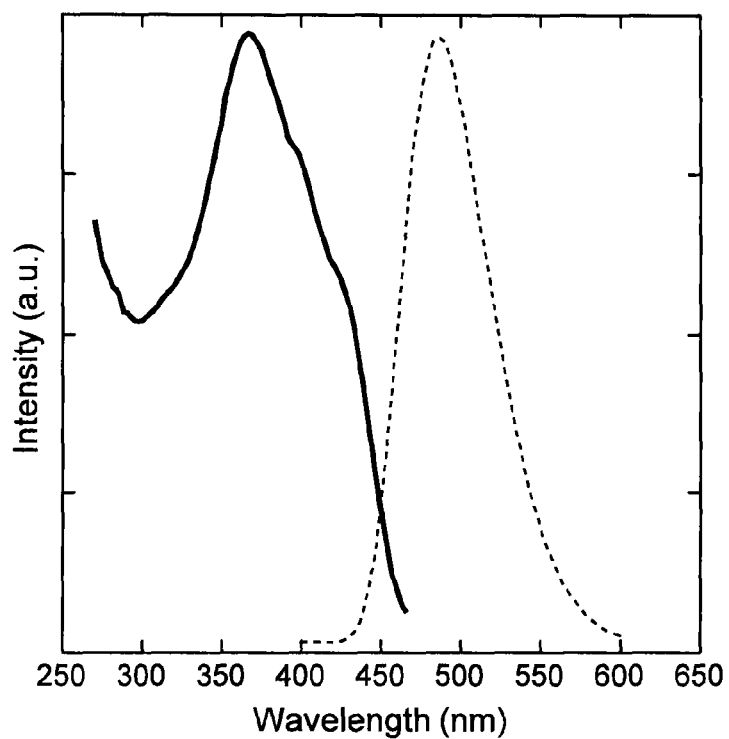
FIG. 4 is a graphical representation of exemplary excitation and emission spectra for second persistent phosphor, $Sr_4Al_{14}O_{25}:Eu^{2+}, Dy^{3+}$.
Figure 5:
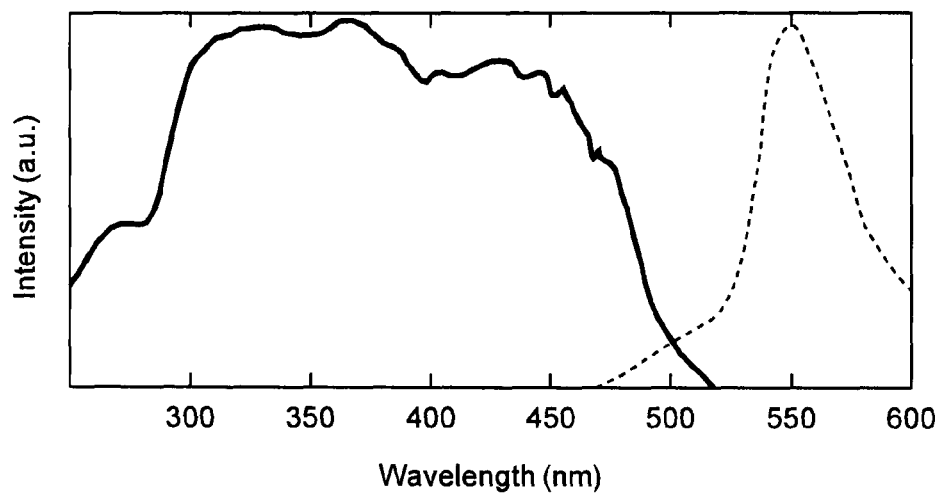
FIG. 5 is a graphical representation of exemplary excitation and emission spectra for third non-persistent phosphor, $(Ca, Sr)_8(Mg,Zn)(SiO_4)_4Cl_2:Eu^{2+}, Mn^{2+}$ (CASI)
Figure 6:
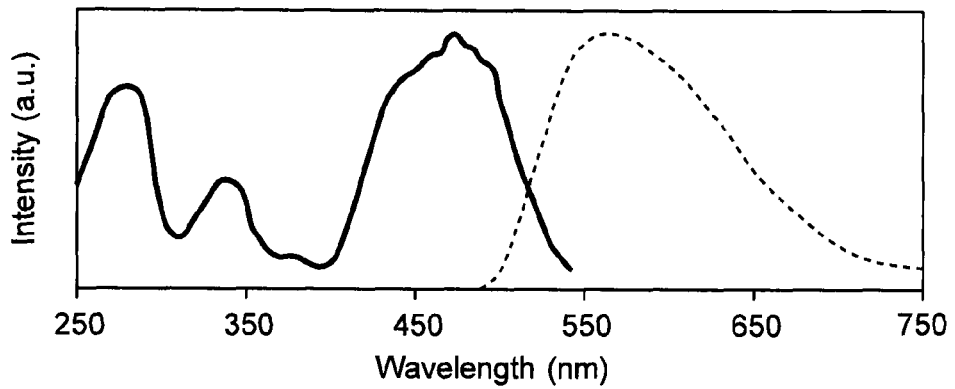
FIG. 6 is a graphical representation of exemplary excitation and emission spectra for third non-persistent phosphor, $(Tb, Y, Lu, La, Gd)_3(Al, Ga)_5O_{12}:Ce^{3+}$ (TAG:Ce)
Figure 7:
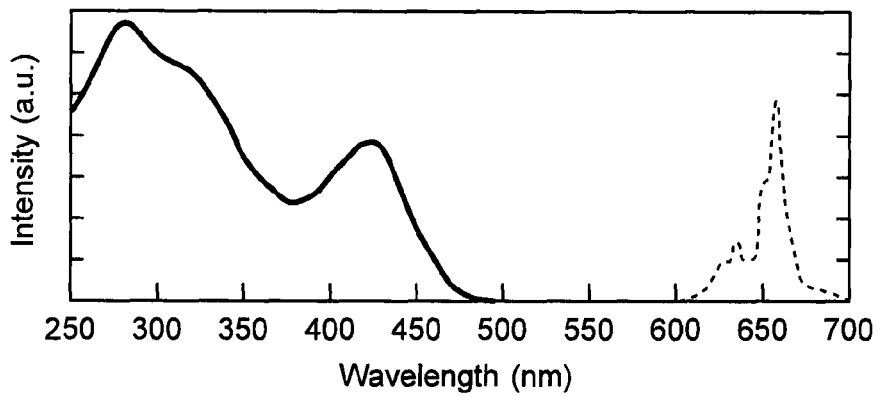
FIG. 7 is a graphical representation of exemplary excitation and emission spectra for third non-persistent phosphor, $3.5MgO\text{-}0.5MgF_2\text{—}GeO_2; Mn^{4+}$ (MFG)
Figure 8:
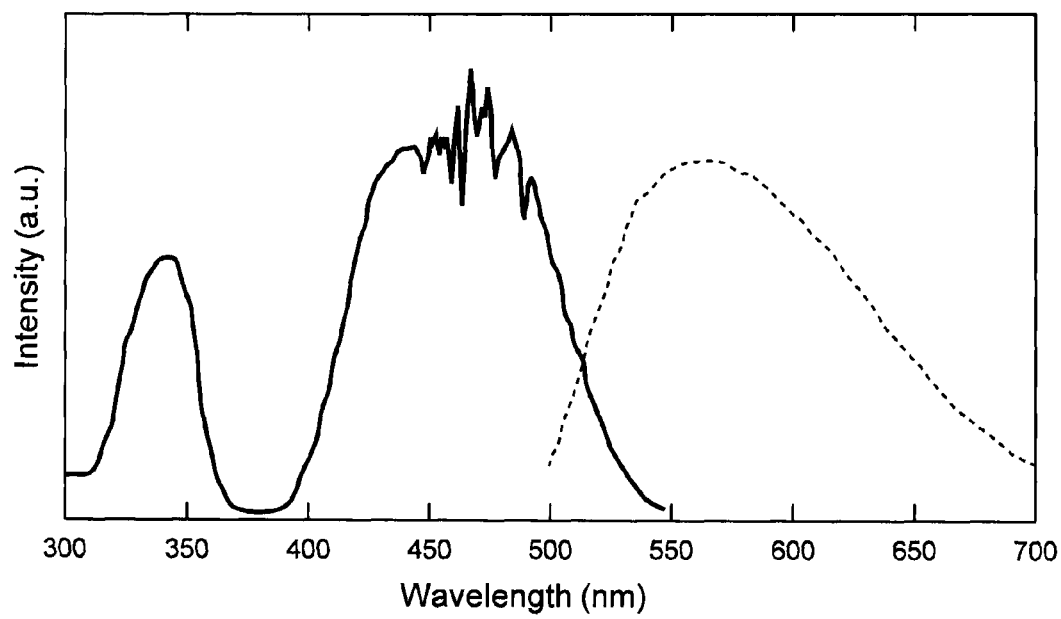
FIG. 8 is a graphical representation of exemplary excitation and emission spectra for third non-persistent phosphor $Y_3Al_5O_{12}; Ce^{3+}$ (YAG:Ce)

In order for energy to be transferred from the persistent phosphors to the third, non-persistent phosphor, the emission spectrum of the persistent phosphors must have some overlap with the excitation spectrum of the third non-persistent phosphor. To illustrate this point, FIGS. 3-8 show the excitation spectra (solid lines) and emission spectra (dotted lines) of phosphors that may be used herein. For example, FIG. 3 shows the excitation and emission spectra for an exemplary first persistent phosphor, $Ca_{0.90}Eu_{0.005}Nd_{0.03}Al_2O_4$. The emission spectrum has a maximum intensity at about 450 nm, with some intensity in the range of about 400 nm to about 550 nm. FIG. 4 shows the excitation and emission spectra for an exemplary second persistent phosphor, $Sr_{3.92}Eu_{0.05}Dy_{0.03}Al_{14}O_{25}$. The emission spectrum has a maximum intensity at about 490 nm with some intensity in a range of about 450 to 550 nm.

Regarding the third phosphors, FIGS. 5-8 show the emission and excitation spectra for CASI, TAG:Ce, MFG and YAG:Ce. Here it is seen that the excitation spectra of CASI, TAG:Ce, MFG and YAG:Ce overlap the emission spectra of the persistent phosphors shown in FIGS. 3 and 4 especially at a wavelength in a range of 450 nm-470 nm and in particular about 460 nm.

EXAMPLE

The white blend persistent phosphor comprises three components; a blue emitting persistent phosphor, a blue-green emitting persistent phosphor and a yellow-red emitting conventional phosphor. In the following example, the blue persistent phosphor was Luminova V300M, the blue green persistent phosphor was UMC BG300M and the yellow-red conventional phosphor was YAG:$Ce^{3+}$ (refer to U.S. Pat. No. 6,409,938). The individual components were weighed in the ratios described in Table 1 and then mechanically blended until uniform mixtures of each blend were obtained. The following blends (in wt %) were evaluated as shown in Table 1 below.

TABLE 1

| Sample Blends | Red non-persistent phosphor | Blue-green persistent phosphor | Blue persistent phosphor |
|---|---|---|---|
| A | 2 | 7 | 1 |
| B | 5 | 4 | 1 |
| C | 5.5 | 2.7 | 1.8 |
| D | 5 | 3 | 2 |
| E | 4 | 3 | 3 |
| F | 3 | 3 | 4 |
| G | 4 | 3 | 4 |
| H | 3 | 3 | 4.5 |
| I | 2.5 | 3 | 4.5 |

Based on the amounts of phosphors used in each blend as shown in Table 1 and the results, in which samples H and I produced the best white color, ratios of amounts (in % wt) of the third non-persistent phosphor, the second persistent phosphor and the first persistent phosphor in the blend can be approximately 2-3:2-4:3-5, respectively and, in particular, approximately 3:3:4.5, still more particularly approximately 2.5:3:4.5, with the amounts of the three phosphors totaling 100% of the blend by weight.

Persistence time is the time, after discontinuing irradiation, that it takes for phosphorescence of a sample to decrease to the threshold of eye sensitivity. This threshold is the signal level of emission intensity that a naked (i.e., unaided) eye can clearly see in the dark. Persistence times are assessed by measuring phosphorescence intensity as a function of time. As used herein, "long persistent phosphor" refers to materials having persistence times exceeding 2 hours. The persistence time of the phosphor blend or layered structure of the three phosphors may exceed two or more hours. It is generally the case that phosphors having longer persistence times are more preferred. The phosphors of the blend or the layered structure of the three phosphors may exhibit phosphorescence persistence times of greater than about two hours.

The persistence of phosphors made in accordance with the present techniques may be longer than previous phosphors. A decay curve displays the decay time, e.g., the time required for the phosphor to stop emitting light after the excitation is removed. A typical phosphor can have a decay on a time scale of seconds.

Figure 9:
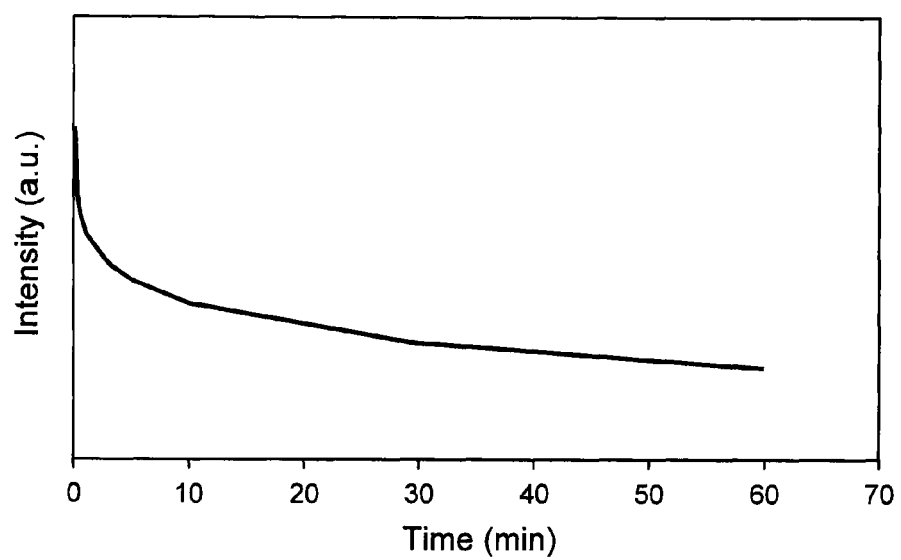
FIG. 9 is a decay curve showing intensity as a function of time for the blend of Sample I described below.

In contrast to the luminescence decay curves of a conventional phosphor, FIG. 9 is a decay curve of phosphor blend I of Table 1 in accordance with this disclosure. As can be seen from this decay curve, much more energy may be retained at the equivalent period of time compared to a typical phosphor; the phosphor can persist for as long as 8 hours or more after the charging illumination has been removed. It should be noted that the scale used for decay is typically logarithmic and, thus, the value of the emission intensity at 8 hours is very weak as compared to the initial intensity. However, the remaining intensity may still be strong enough to still be seen by the human eye in a totally dark environment.

Figure 10A:
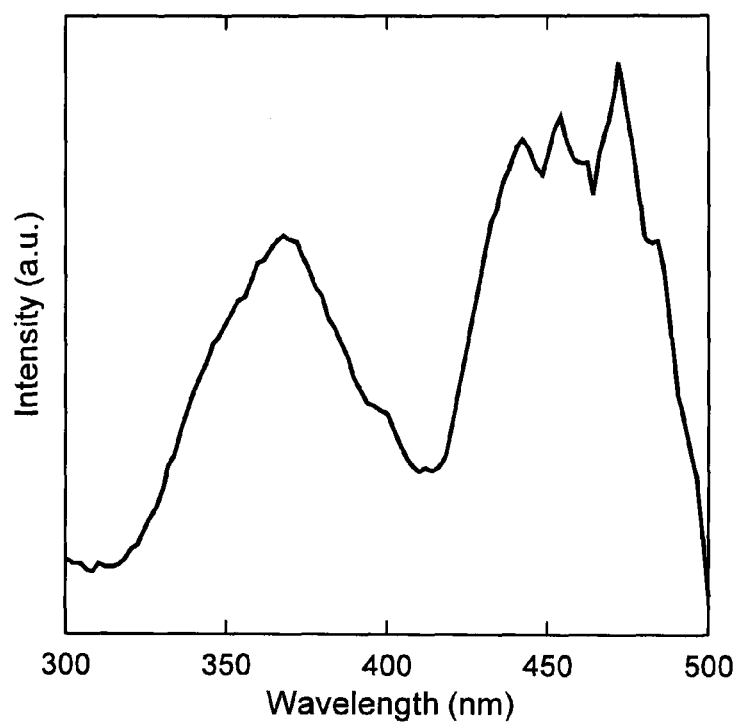
FIGS. 10A, 10B are graphical representations of excitation and emission spectra, respectively, for the blend of Sample I described below.
Figure 10B:
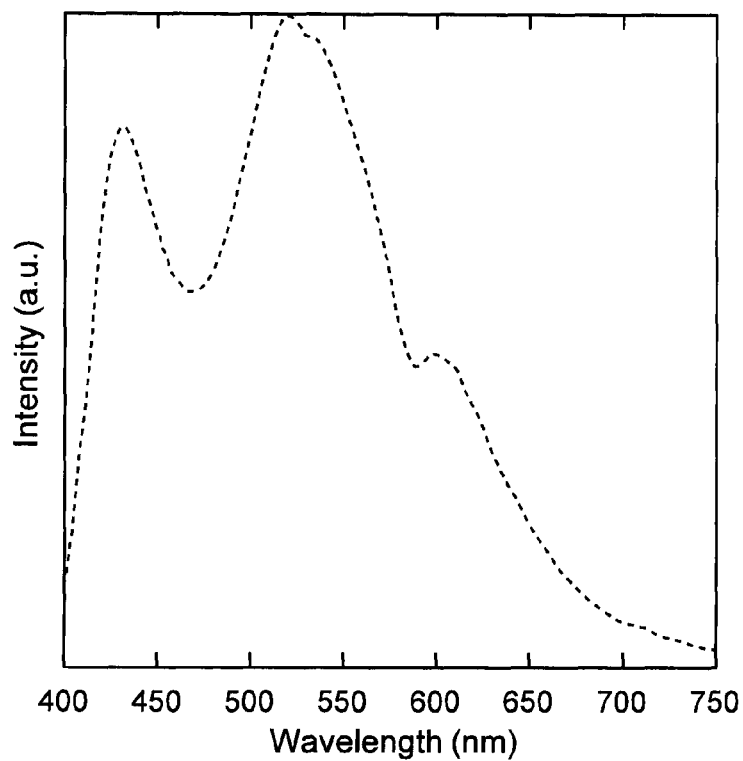

FIGS. 10A and 10B show excitation and emission spectra, respectively, for the blend of Sample I of Table 1. It can be seen that the emission spectrum extends across wavelengths of about 420 to about 700 nm covering the entire visible spectrum and producing white light.

The following Table 2 shows CIE color coordinates as a function of time following two minutes of excitation for samples H and I. From this table it can be seen that samples H and I produce a near white emission with acceptable color shift over time.

TABLE 2

| Sample | Time after 2 min Excitation | ccx | Ccy |
|---|---|---|---|
| H | 1 min | 0.2631 | 0.3503 |
| H | 5 min | 0.2862 | 0.3730 |
| H | 9 min | 0.2977 | 0.3771 |
| I | 1 min | 0.2557 | 0.3406 |
| I | 5 min | 0.2803 | 0.3651 |
| I | 9 min | 0.2925 | 0.3705 |

In general, various articles of manufacture discussed below and in the Ser. No. 12/640,712 application may comprise the phosphor blend or individual first, second and third phosphors used in at least two layers thereof, including luminous materials such as paints, inks, plastics, resins, ceramics and glasses. These materials may be used in novelty articles such as toys, jewelry, ornaments, writing implements, and apparel. The phosphors may be also used in any application requiring long term light emission in locations that have no energy source for powered lighting, particularly for lighting and signage in security, safety, and emergency egress applications.

The phosphors may be incorporated into numerous products used in low light applications, for example, the front faceplate of a car radio, or in the controls attached to the faceplate. The low toxicity of the phosphors makes applications such as toys and other commercial or consumer goods a possibility. Furthermore, the long persistence of the phosphor makes it useful for applications in safety apparel, such as hard hats, where the phosphors may be incorporated into the body or into stickers or decals applied to the side, or safety clothing with lettering, where the phosphor may be incorporated either in fibers making up the fabric of clothing or into the lettering.

The phosphors may also be used in safety signage and tape to form informational icons, such as directional arrows, pictograms, or text, when the phosphorescent material becomes the dominant light source upon the removal of ambient light. Thus, the informational icons begin to perceptually "glow" (luminesce) automatically upon failure of the ambient lighting system. The icons may be of a visually simple form, such as directional arrows guiding persons in the proper direction to access to the nearest emergency exit. Alternatively, or additionally, informational icons of such type can be deployed to point out important information, such as emergency evacuation information and directions, the location of fire extinguishers and electrical equipment, personal safety information, and location of life rafts, first-aid kits, communications terminals, or other emergency equipment. The phosphorescent material may also be used to demarcate the outlines and intersections of building structures, such as walls, stairs, etc. Informational icons may be formed in the text of any written language(s), or alternatively may be multilingual in character. Alternatively, or additionally, the informational icons may include any of the international standard pictograms, which convey information entirely through outline/area, and do not rely on color or text. Any of the aforementioned informational icons may be formed in a "positive" or "negative" manner, i.e., the icon can be defined by the presence of phosphorescent material against a background void of photoluminescence, or the icon can be defined by the absence of photoluminescence against a background comprising the phosphorescent material.

The phosphors may be also be used in lighting systems for emergency egress. Such lighting systems can be used to provide lighting in stairwells, fire escapes, hallways, exits, and elevators and provide sufficient light in the event of a power failure to allow for safe and orderly exit from dark areas. The lighting systems include a light source and at least one phosphor radiationally coupled to the light source. Radiationally coupled means that the elements are associated with each other so radiation from one is transmitted to the other. Suitable light sources include, but are not limited to, fluorescent tubes, compact fluorescent lamps, LED lamps, and incandescent bulbs. The phosphor may be in direct contact with the light source, or may be physically separated from it, but positioned so that light of sufficient energy falls on the phosphor cause excitation. Thus, the phosphor may be coated over or directly on the light emitting surface of the light source by coating and drying a suspension of the phosphor. The surface on which the phosphor is disposed is typically transparent to allow white light to be transmitted through it. Although not intended to be limiting, in one embodiment, the median particle size of the phosphor may range from about 1 to about 20 microns. In a non-limiting example, the phosphors may be coated onto a surface of a fluorescent tube or envelope. The phosphors may be coated on the inside or outside surface of the tube. The phosphor blend or at least two layers of the first, second and third phosphors may be used in a fluorescent lamp to produce white light, having a desired correlated color temperature (CCT) and color rendering index (CRI). The phosphor may be coated on the inside of the glass envelope of a fluorescent lamp with or without a barrier layer between the phosphor and the glass. The phosphor may be coated on the entire inside or outside surface of the tube or on only a bottom portion of the inside or outside surface. In another example, the phosphors may be contained in a film formed into a sleeve surrounding the fluorescent tube.

Other applications include fire call boxes from a fire system. The fire call box has both a visual indicator and/or signage that has at least one of the aforementioned phosphors incorporated therein or thereon. Similarly, a fire call box includes a visual indicator and/or signage. The background has the aforementioned phosphor incorporated therein or thereon. A card access reader from a security system includes a background structure and a reading device thereon. Either the background structure and/or the reading device have incorporated therein and/or thereon at least one of the aforementioned phosphors.

One of ordinary skill in the art will clearly recognize that other articles may use the phosphors such as a sensor, a panel, an access device, a sounder, a fire call box, an access card reader, and the like. Other uses of the phosphors may include ancillary uses to the fire and/or security systems. For example, signage or indicia (egress paths, egress items, etc.) related to the fire and/or security systems may employ the phosphor. To aid occupants and/or emergency personnel in the event of an emergency at least one of the aforementioned phosphors may be used. For example, egress paths show appropriate egress to an exit stairwell. Other ancillary articles that can use the phosphors may include a door knob or panic bar, stair nosings or risers, stair railings and the like.

Another aspect of the present invention is that a particular color (or group or range of colors) may be employed to provide an indicia of a function of the particular structure. For example, the aforementioned items may be colored using a green colored persistent phosphor and/or phosphor blends providing an indication that, in an event of an emergency, exiting via the stairwell is desired. Contrastingly, red-colored persistent phosphor and/or phosphor blends may be used at or in the path to the elevator so as to provide an indication, an event of an emergency, exiting via the elevator is not desired. In this manner, increased visibility of safety (e.g., fire, security, etc.) hardware and building access devices is provided. These different colored persistent phosphors would be used in addition to the white persistent phosphor as comprising part of the structure.

Only a few examples of articles of manufacture that comprise the combination of phosphors or phosphor blend of this disclosure are provided here and this is not intended to limit the phosphors to these applications or uses. Those skilled in the art will recognize that a long lived persistent phosphor may be useful in a large variety of applications beyond the ones listed above. For example, the material may be used as a phosphor in a cathode ray tube, in a plasma display device, in a liquid crystal display (LCD). The phosphors may also be used in a LED lamp. These uses are meant to be merely exemplary and not exhaustive. These and other articles that may comprise the phosphor are described in more detail in the Ser. No. 12/640,712 application.

The persistent phosphor may be applied on a structure, integrated in the structure, and/or be integrated in a coating on the structure. In an embodiment, the coating may be a paint. In another embodiment, the structure may be made of a resin. Similarly, the phosphors may be incorporated in the resin.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A blend of a first persistent phosphor, a second persistent phosphor and a third non-persistent phosphor, wherein said first persistent phosphor has a formula I:

$$Ca_{x-y-z-a}A_aAl_{2-m-n-o-p}O_d:Eu_y,RE_z,B_m,Zn_n,Co_o,Sc_p \qquad I$$

where x is between 0.75 and 1.3; y is between about 0.0005 and about 0.1; z is between about 0.0005 and about 0.1; a is between about 0 and about 0.2; A is one or both of Sr and Ba; m is between about 0 and about 0.3; n is between about 0 and about 0.1; o is between about 0 and about 0.01; p is between about 0 and about 0.10; RE is any rare earth ion and d ranges from about 3.945 to about 4.075;

wherein said second persistent phosphor has a formula II:

$$Sr_{x-y-z-a}A_aAl_{14-m-n-o-p}O_d:Eu_y,RE_z,B_m,Zn_n,Co_o,Sc_p \qquad II$$

where x is between 3.0 and 5.2; y is between about 0.0005 and about 0.1; z is between about 0.0005 and about 0.1; a is between about 0 and about 0.2; A is one or both of Ca and Ba; m is between about 0 and about 0.3; n is between about 0 and about 0.1; o is between about 0 and about 0.01; p is between about 0 and about 0.10; RE is any rare earth ion and d ranges from about 23.945 to about 26.425; and wherein said third phosphor is a non-persistent phosphor that is excited at a wavelength in a range of 300-500 nm.

2. The phosphor blend of claim 1 wherein RE is at least one of $Dy^{3+}$ and $Nd^{3+}$.

3. The phosphor blend of claim 1 wherein said third phosphor is selected from the group consisting of 3.5MgO-0.5MgF$_2$—GeO$_2$; Mn$^{+4}$ (MFG); $Y_3Al_5O_{12}$; Ce (YAG:Ce$^{3+}$); (Tb, Y, Lu, La, Gd)$_3$(Al, Ga)$_5O_{12}$:Ce$^{3+}$ (TAG:Ce); (Ca, Sr)$_8$(Mg,Zn)(SiO$_4$)$_4$Cl$_2$:Eu$^{2+}$, Mn$^{2+}$ (CASI) and combinations thereof.

4. The phosphor blend of claim 1 comprising at least one additional phosphor in said blend.

5. The phosphor blend of claim 1 wherein ratios of amounts (in % wt) of said third phosphor, said second persistent phosphor and said first persistent phosphor in said blend are approximately 2-3:2-4:3-5, respectively, with the amounts of said third phosphor, said second phosphor and said first phosphor totaling 100% of the blend by weight.

6. The phosphor blend of claim 5 wherein said ratios are approximately 3:3:4.5.

7. The phosphor blend of claim 5 wherein said ratios are approximately 2.5:3:4.5.

8. The phosphor blend of claim 1 wherein once said blend has been excited said blend appears white in an absence of ambient light.

9. The phosphor blend of claim 1 wherein said formula II of said second persistent phosphor is $Sr_{4-y-z}Al_{14}O_{25}:Eu^{2+}_y, Dy^{3+}_z$.

10. The phosphor blend of claim 9 wherein said formula I of first persistent phosphor is $Ca_{1-y-z}Al_2O_4:Eu^{2+}_y, Nd^{3+}_z$.

11. The phosphor blend of claim 10 wherein said third phosphor is selected from the group consisting of 3.5MgO-0.5MgF$_2$—GeO$_2$; Mn$^{+4}$ (MFG); $Y_3Al_5O_{12}$; Ce (YAG:Ce$^{3+}$); (Tb, Y, Lu, La, Gd)$_3$(Al, Ga)$_5O_{12}$:Ce$^{3+}$ (TAG:Ce); (Ca, Sr)$_8$(Mg,Zn)(SiO$_4$)$_4$Cl$_2$:Eu$^{2+}$, Mn$^{2+}$ (CASI) and combinations thereof.

12. The phosphor blend of claim 1 wherein said third phosphor is selected from the group consisting of a yellow emitter, a yellow-orange emitter, an orange-red emitter, a red emitter and combinations thereof.

13. An article of manufacture comprising said phosphor blend of claim 1.

14. An article of manufacture comprising at least two layers having one or more of a first persistent phosphor, a second persistent phosphor and a third phosphor in each of said layers, wherein said first persistent phosphor has a formula I:

$$Ca_{x-y-z-a}A_aAl_{2-m-n-o-p}O_d:Eu_y,RE_z,B_m,Zn_n,Co_o,Sc_p \qquad I$$

where x is between 0.75 and 1.3; y is between about 0.0005 and about 0.1; z is between about 0.0005 and about 0.1; a is between about 0 and about 0.2; A is one or both of Sr and Ba; m is between about 0 and about 0.3; n is between about 0 and about 0.1; o is between about 0 and about 0.01; p is between about 0 and about 0.10; RE is any rare earth ion and d ranges from about 3.945 to about 4.075;

wherein said second persistent phosphor has a formula II:

$$Sr_{x-y-z-a}A_aAl_{14-m-n-o-p}O_d:Eu_y,RE_z,B_m,Zn_n,Co_o,Sc_p \quad \text{II}$$

where x is between 3.0 and 5.2; y is between about 0.0005 and about 0.1; z is between about 0.0005 and about 0.1; a is between about 0 and about 0.2; A is one or both of Ca and Ba; m is between about 0 and about 0.3; n is between about 0 and about 0.1; o is between about 0 and about 0.01; p is between about 0 and about 0.10; RE is any rare earth ion and d ranges from about 23.945 to about 26.425; and wherein said third phosphor is a non-persistent phosphor that is excited at a wavelength in a range of 300-500 nm.

15. The article of manufacture of claim 14 wherein RE is at least one of $Nd^{3+}$ and $Dy^{3+}$.

16. The article of manufacture of claim 15 wherein said third phosphor is selected from the group consisting of $3.5MgO$-$0.5MgF_2$—$GeO_2$; $Mn^{+4}$ (MFG); $Y_3Al_5O_{12}$; Ce (YAG:$Ce^{3+}$); (Tb, Y, Lu, La, Gd)$_3$(Al, Ga)$_5O_{12}$:$Ce^{3+}$ (TAG: Ce); (Ca, Sr)$_8$(Mg,Zn)(SiO$_4$)$_4$Cl$_2$:$Eu^{2+}$, $Mn^{2+}$ (CASI) and combinations thereof.

17. The article of manufacture of claim 14 comprising at least one additional phosphor.

18. The article of manufacture of claim 14 wherein once said first persistent phosphor, said second persistent phosphor and said third non-persistent phosphor have been excited light emitted from said phosphors appears white in an absence of ambient light.

19. The article of manufacture of claim 14 wherein said formula II of said second persistent phosphor is $Sr_{4-y-z}Al_{14}O_{25}$:$Eu^{2+}_y$, $Dy^{3+}_z$.

20. The article of manufacture of claim 19 wherein said formula I of first persistent phosphor is $Ca_{1-y-z}Al_2O_4$:$Eu^{2+}_y$, $Nd^{3+}_z$.

21. The article of manufacture of claim 20 wherein said third phosphor is selected from the group consisting of $3.5MgO$-$0.5MgF_2$—$GeO_2$; $Mn^{+4}$ (MFG); $Y_3Al_5O_{12}$; Ce (YAG:$Ce^{3+}$); (Tb, Y, Lu, La, Gd)$_3$(Al, Ga)$_5O_{12}$:$Ce^{3+}$ (TAG: Ce); (Ca, Sr)$_8$(Mg,Zn)(SiO$_4$)$_4$Cl$_2$:$Eu^{2+}$, $Mn^{2+}$ (CASI) and combinations thereof.

22. The article of manufacture of claim 14 wherein said third phosphor is selected from the group consisting of a yellow emitter, a yellow-orange emitter, an orange-red emitter, a red emitter and combinations thereof.

23. The article of manufacture of claim 14 comprising three of said layers, wherein said first persistent phosphor, said second persistent phosphor and said third non-persistent phosphor each are present in a different one of said layers.

* * * * *